Aug. 5, 1969    R. K. SHELBY    3,458,903
FORMATION OF PLASTIC ARTICLES BY EMPLOYING A POSITIVE PRESSURE
Filed March 15, 1966
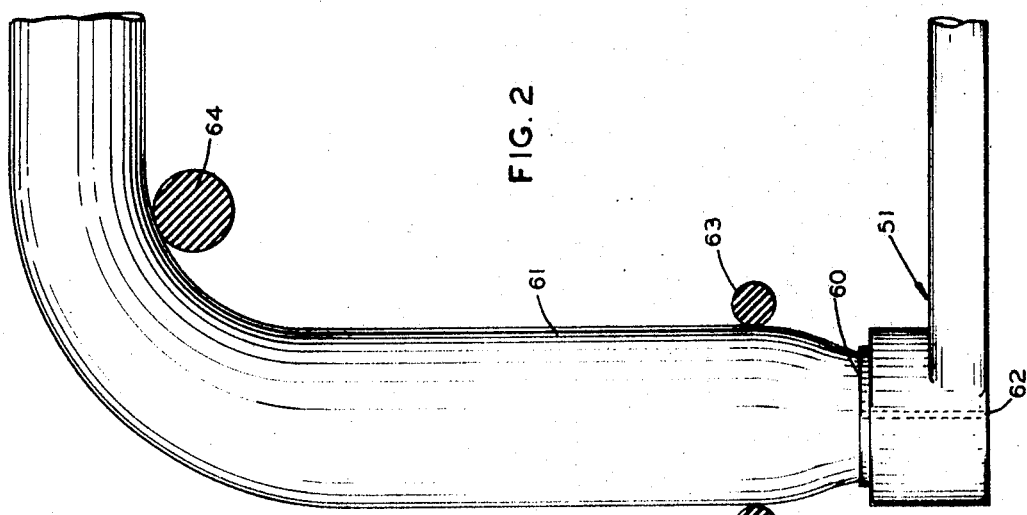
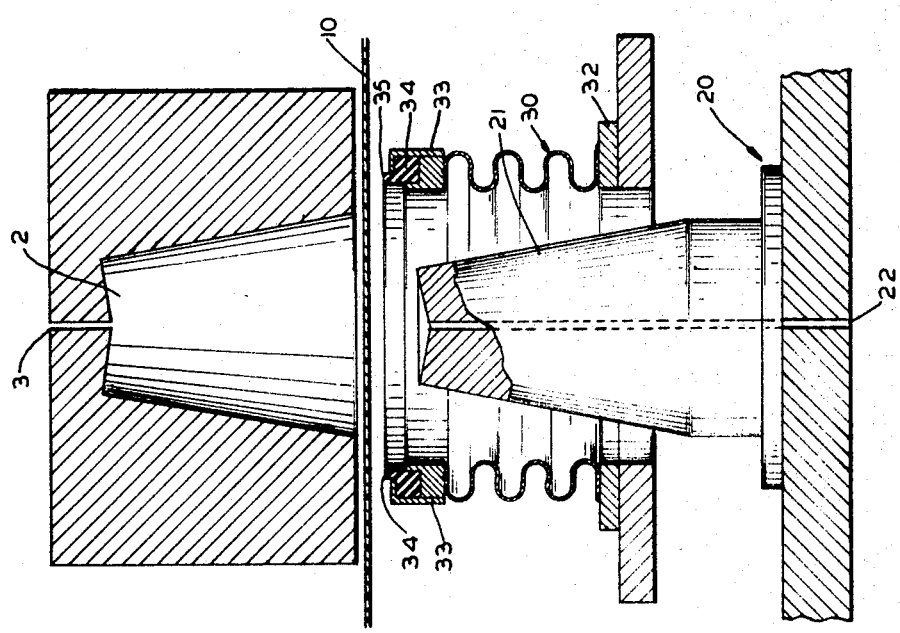
INVENTOR
RICHARD K. SHELBY
BY
*Robert J. Schaap*
ATTORNEY United States Patent Office 3,458,903
Patented Aug. 5, 1969

3,458,903
FORMATION OF PLASTIC ARTICLES BY EMPLOYING A POSITIVE PRESSURE
Richard K. Shelby, Chicago, Ill., assignor to Monsanto Company, St. Louis, Mo., a corporation of Delaware
Filed Mar. 15, 1966, Ser. No. 534,441
Int. Cl. B29c 17/04, 17/07
U.S. Cl. 18—19                                    4 Claims

ABSTRACT OF THE DISCLOSURE

A pressure sealing ring which is adapted to be mounted upon rigid retaining rings in pressure applicators used in molding operations where the retaining ring receives gaseous pressure. The sealing ring comprises a linear copolymer of approximately 55 to 65 weight percent of vinylidene fluoride and approximately 45 to 35 weight percent hexafluoropropylene. The sealing ring engages a soft heated thermoplastic material and when gaseous pressure is applied to the retaining ring, a portion of the sealing ring moves radially outwardly to stretch the hot thermoplastic material.

---

This invention relates to a novel method and apparatus for forming thermoplastic articles, and more particularly to a method for applying a positive pressure of a fluid medium against the thermoplastic material in order to improve the forming operation.

It is a primary object of the present invention to provide a novel method and novel apparatus for the application of a positive pressure to sheet-form, thermoplastic materials which are to be shaped as various types of containers, cups and the like.

Methods and apparatus have been heretofore known in the art for applying a vacuum to a heated sheet of thermoplastic material in order to shape such material into a desired form such as cups and various containers for example jars, bottles and fitments. Blowing processes are also known in which an internal fluid pressure is applied to a mass or web of thermoplastic material in order to shape the material into a desired form such as a continuous tubular film, bottle, and the like.

The present invention represents an advantage over prior knowledge in the coordination of both positive and negative pressures applied on two sides of a sheet or web of thermoplastic material during the forming operation, particularly with regard to deep drawing operations. The present invention also makes it possible to make uniform thin-walled containers and other shapes without bursting the drawn material. Consequently, it is possible to make lighter containers and to produce a larger number of containers from a given weight of the thermoplastic material. The thin-walled shaped products thus obtained have a more desirable appearance because of the uniformity of the wall as well as the base thickness which also improves the heat transfer properties of the shaped objects, for example as a cup intended for hot liquids such as for hot coffee. The lighter weight of the product of the molding operation is of course an ådvantage in reducing costs for a given number of the shaped objects.

The present invention is based upon a flexible pressure applicator coordinating with a moving plunger to permit the imposition of a fluid pressure such as vacuum, air or steam pressure against a web of a thermoplastic material such as styrene. In the usual molding process, the web is forced into a die to receive the shape of the die, and it is also common to use a plug assist to aid in moving the web of material into the die.

It has been found that the forming operation is improved when a localized area of the thermoplastic web is subjected to a fluid pressure to force the thermoplastic web more uniformly and rapidly against the die surface.

A serious problem which has been encountered in the above described prior art fabrication method is that the heating of the thermoplastic material in order to form and shape the same causes the material to become very sticky while in the semifluid forming condition. The sticky material adheres readily to metal, wood and ordinary rubber gaskets and sealing members used to control the application of vacuum or pressure.

The present invention overcomes the above-described problems of sticking of thermoplastic materials such as vinyl polymers, for example polyvinyl chloride, styrene, and rubber modified polystyrene, as well as polyethylene, polypropylene and other hydrocarbon polymers. The problem of sticking of thermoplastic polymeric materials is overcome by providing contact surfaces of a specific substance which bear against such materials when under semifluid conditions. The novel contact material used in this relationship is constituted by linear copolymers of vinylidene fluoride with hexafluoropropylene, containing from 62 to 68% fluorine, preferably about 65% fluorine by weight. The copolymer of the present invention contains 55 to 65 weight percent of vinylidene fluoride and the remainder, namely 45 to 35 weight percent of hexafluoropropylene. This novel material, after copolymerization thereof may be partially compounded with natural and synthetic rubber materials, but such additional polymeric materials should not be present in greater proportion than 50% by weight.

It has been found that this specific polymeric material is of unusual utility in the present application in providing a positive pressure or vacuum seal between rapidly moving mechanical parts, even at high operating temperatures. The polymeric material employed in the present relationship is a linear copolymer of vinylidene fluoride and hexafluoropropylene preferably containing about 65% fluorine. These monomers constitute the essential components of the copolymer, although minor proportions of other monomers may be present in the copolymerization. The copolymerization which is carried out by known means such as by the use of a peroxide catalyst, gives high yields.

The copolymer is fabricated into the desired seal by methods well known in the elastomer art such as by the use of amine vulcanizing agents e.g., in the proportion of from 0.5 to 5.0% by weight based upon the polymer and with carbon black employed in the proportion of from 0 to 50% by weight. The final shaping of the pressure and vacuum maintaining seal is carried out using a steel mold and a conventional curing temperature such as from 100° C. to 200° C.

Apparatus which employs the above-described solid copolymer of vinylidene fluoride with hexafluoropropylene may take various forms as illustrated by various representative devices shown in the drawings forming a part of the present patent application. In the drawings, FIGURE 1 shows a male and female die set for the production of shaped objects such as cups from a sheet of thermoplastic material, for example styrene.

In FIGURE 1 illustrating a male and female die set for the fabrication of shaped objects such as cups from a sheet form of thermoplastic material such as polystyrene, the upper die 1 contains a mold cavity 2 having a vent 3 to provide for the removal of air from the mold during the forming operation, or the application of pressure in order to aid in forming the cup. Element 10 represents the web of thermoplastic polystyrene which has been heated prior to admission to the mold. The male portion of the lower die 20 has a forming element 21 and is also provided with a vent 22 for the application of fluid pressure such as air pressure to control the forming operation and particularly for the purpose of achieving uniform wall thickness of the polystyrene. In order to seal the pressure during the forming operation, a positive pressure seal system 30, suitably actuated to coordinate with the lower die 20 holds a cylindrical blower 31 by means of retaining rings 32 and 33. A sealing ring 34, or so-called "contact ring" of grossly rectangular cross section preferably has an upper lip 35 at the internal corner of the contact surface. The sealing ring 34 enables direct contact to be made against the hot web of thermoplastic material during the forming operation without incurring sticking of the thermoplastic material against the metallic and wooden members, such as forming element 21 which may suitably be made of a metal such as aluminum, or may be made of wood. The sealing ring 34 is made of the solid linear copolymer of vinylidene fluoride with hexafluoropropylene, containing about 65% fluorine.

The contact ring of the said copolymer also helps to stretch the web of thermoplastic material as it is gripped and stretched. In a preferred embodiment of the invention, the ring 34 has a cross section which is grossly rectangular, and with an upper lip at the internal corner of the remote surface of said rectangular cross section. Upon application of a fluid pressure, the said upper lip moves radially outwardly to stretch the said hot thermoplastic material. In another preferred embodiment the said ring also has a channel in the inside face of the cross section of the said rectangular ring, so that the channel can bear against a boss on the base to which the ring is secured. In this way the expansion of the said ring upon application of a fluid pressure pivots the circular sealing member about the said channel when the said channel bears against the said boss.

FIGURE 2 illustrates an extrusion or blowing operation.

A continuously moving hollow tube of polyethylene is manufactured. The use of contact elements of the present linear polymer of vinylidene fluoride with hexafluoropropylene containing about 65% fluorine solves the problem of sticking of the hot semifluid polyethylene product. In FIGURE 2, extruder 51 is provided with a cylindrical orifice 60 from which formation of a continuous tube of polyethylene 61 leaves the machine. Air vent 62 provides a positive pressure of air or other gaseous medium which maintains the desired tubular diameter of the extruded polyethylene. Guide rings 63 of the herein described copolymer of vinylidene fluoride with hexafluoropropylene permit controlling the high speed motion of the extruding tube without encountering sticking. After the tube 61 has traversed a suitable distance, and optionally has been subjected to cooling by means of an air stream, the polyethylene tube may be rolled over a pulley member 64 of the above-described solid linear polymer of vinylidene fluoride with hexafluoropropylene containing about 65% of fluorine without encountering sticking of the polyethylene product.

Having thus described my invention, what I desire to claim and secure by Letters Patent is:

1. A flexible circular pressure sealing ring comprising essentially a linear copolymer of vinylidene fluoride and hexafluoropropylene, adapted to be mounted upon a rigid retaining ring having a gaseous pressure entrance, said circular sealing ring also being adapted at its end remote from the retaining ring to seal the said gaseous pressure against a heated, soft thermoplastic material, the said sealing ring having a cross section which is substantially L-shaped and with the upright leg being at the internal corner of the sealing ring, whereby upon application of a gaseous pressure, the said upper leg moves radially outwardly to stretch the said hot thermoplastic material.

2. A flexible circular pressure sealing ring comprising essentially a linear copolymer of vinylidene fluoride and hexafluoropropylene, adapted to be mounted upon a rigid base having a fluid pressure entrance, said circular ring also being adapted at its end remote from the base to seal the said fluid pressure against a heated, soft thermoplastic material, the said ring having a cross section which is grossly rectangular and with an upper lip at the internal corner of the remote surface of said rectangular cross section, whereby upon application of a fluid pressure, the said upper lip moves radially outwardly to stretch the said hot thermoplastic material, the said ring also having a channel in the inside face of the cross section of the said rectangular ring whereby the expansion of the said ring upon application of a fluid pressure pivots the circular sealing member about the said channel when the said channel bears against the said boss.

3. A flexible circular pressure sealing ring comprising a tetrafluoroethylene copolymer adapted to be mounted upon a rigid retaining ring having a gaseous pressure entrance, said circular sealing ring also being adapted at its end remote from the retaining ring to seal the said gaseous pressure against a heated, soft thermoplastic material, the said sealing ring having a cross section which is substantially L-shaped and with the upright leg being at the internal corner of the sealing ring, whereby upon application of a gaseous pressure, the said upper leg moves radially outwardly to stretch the said hot thermoplastic material.

4. A flexible circular pressure sealing ring comprising a tetrafluoroethylene copolymer adapted to be mounted upon a rigid base having a fluid pressure entrance, said circular ring also being adapted to its end remote from the base to seal the said fluid pressure against a heated, soft thermoplastic material, the said ring having a cross section which is grossly rectangular and with an upper lip at the internal corner of the remote surface of said rectangular cross section, whereby upon application of a fluid pressure, the said upper lip moves radially outwardly to stretch the said hot thermoplastic material, the said ring also having a channel in the inside face of the cross section of the said rectangular ring whereby the expansion of the said ring upon application of a fluid pressure pivots the circular sealing member about the said channel when the said channel bears against the said boss.

References Cited

UNITED STATES PATENTS

| | | | |
|---|---|---|---|
| 2,967,328 | 1/1961 | Shelby et al. | 18—19 |
| 3,173,174 | 3/1965 | Edwards | 18—19 |
| 3,267,516 | 8/1966 | Eckhaus. | |
| 3,284,849 | 11/1966 | Coleman et al. | |

WILLIAM J. STEPHENSON, Primary Examiner